United States Patent
Baba et al.

(10) Patent No.: US 10,716,299 B2
(45) Date of Patent: Jul. 21, 2020

(54) UNDERWATER MOBILE BODY AND NON-TRANSITORY COMPUTER READABLE MEDIUM

(71) Applicant: FUJI XEROX CO., LTD., Tokyo (JP)

(72) Inventors: Motofumi Baba, Kanagawa (JP);
Tsutomu Kimura, Kanagawa (JP);
Kengo Tokuchi, Kanagawa (JP);
Akihito Yamauchi, Kanagawa (JP);
Yoshihiko Nemoto, Kanagawa (JP);
Masahiro Sato, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 239 days.

(21) Appl. No.: 15/591,219

(22) Filed: May 10, 2017

(65) Prior Publication Data
US 2018/0132459 A1    May 17, 2018

(30) Foreign Application Priority Data

Nov. 15, 2016  (JP) ................................. 2016-222069

(51) Int. Cl.
| | |
|---|---|
| *A01K 73/00* | (2006.01) |
| *A01K 74/00* | (2006.01) |
| *A01K 75/00* | (2006.01) |
| *A01K 79/00* | (2006.01) |
| *G01S 15/96* | (2006.01) |
| *A01K 61/95* | (2017.01) |
| *A01K 61/80* | (2017.01) |
| *A01K 75/02* | (2006.01) |
| *G05D 1/02* | (2020.01) |
| *A01K 79/02* | (2006.01) |

(Continued)

(52) U.S. Cl.
CPC .............. *A01K 79/00* (2013.01); *A01K 61/80* (2017.01); *A01K 61/95* (2017.01); *A01K 73/00* (2013.01); *A01K 74/00* (2013.01); *A01K 75/00* (2013.01); *A01K 75/02* (2013.01); *A01K 79/02* (2013.01); *G01S 15/86* (2020.01); *G01S 15/96* (2013.01); *G05D 1/0094* (2013.01); *G05D 1/0206* (2013.01); *G05D 1/0692* (2013.01); *Y02A 40/845* (2018.01)

(58) Field of Classification Search
CPC ........ A01K 61/95; A01K 73/00; A01K 74/00; A01K 75/00; A01K 75/02; A01K 79/00; A01K 79/02
USPC ......... 43/4, 7, 17.5, 100, 103, 104; 119/220, 119/719

See application file for complete search history.

(56) References Cited

U.S. PATENT DOCUMENTS

| | | | | |
|---|---|---|---|---|
| 3,638,346 A | * | 2/1972 | Stein ...................... | A01K 74/00 43/102 |
| 4,646,276 A | * | 2/1987 | Kowalewski .......... | A01K 15/02 367/139 |

(Continued)

FOREIGN PATENT DOCUMENTS

| | | | |
|---|---|---|---|
| JP | 2000-217465 | * | 8/2000 |
| JP | 2013-005593 A | | 1/2013 |

*Primary Examiner* — David J Parsley
(74) *Attorney, Agent, or Firm* — Sughrue Mion, PLLC

(57) ABSTRACT

An underwater mobile body includes: a movement control unit that controls movement underwater; a detection unit that moves underwater under the control of the movement control unit and that detects a position of a fish; and a guidance unit that guides the fish based on the position of the fish detected by the detection unit.

19 Claims, 11 Drawing Sheets

(51) Int. Cl.
    *G05D 1/06*    (2006.01)
    *G05D 1/00*    (2006.01)
    *G01S 15/86*   (2020.01)

(56) References Cited

U.S. PATENT DOCUMENTS

| | | | | |
|---|---|---|---|---|
| 4,955,005 | A * | 9/1990 | Loeffelman | A01K 79/00 |
| | | | | 116/22 A |
| 5,850,806 | A * | 12/1998 | Mark | A01K 79/02 |
| | | | | 119/219 |
| 5,899,017 | A * | 5/1999 | Chen | A01K 69/06 |
| | | | | 43/100 |
| 5,937,791 | A * | 8/1999 | Baugher | A01K 79/02 |
| | | | | 119/200 |
| 6,102,619 | A * | 8/2000 | Truebe | E02B 1/006 |
| | | | | 405/81 |
| 6,760,995 | B2 * | 7/2004 | Mueller | A01K 91/02 |
| | | | | 43/26.2 |
| 8,919,034 | B2 * | 12/2014 | Alhuwaishel | A01K 69/06 |
| | | | | 43/100 |
| 2009/0229532 | A1 * | 9/2009 | Herbert | A01K 79/02 |
| | | | | 119/216 |
| 2010/0293831 | A1 * | 11/2010 | Hreinsson | A01K 75/02 |
| | | | | 43/4.5 |
| 2011/0174231 | A1 * | 7/2011 | Edmondson | A01K 79/02 |
| | | | | 119/220 |
| 2015/0136037 | A1 * | 5/2015 | Boonekamp | A01K 61/00 |
| | | | | 119/226 |

* cited by examiner

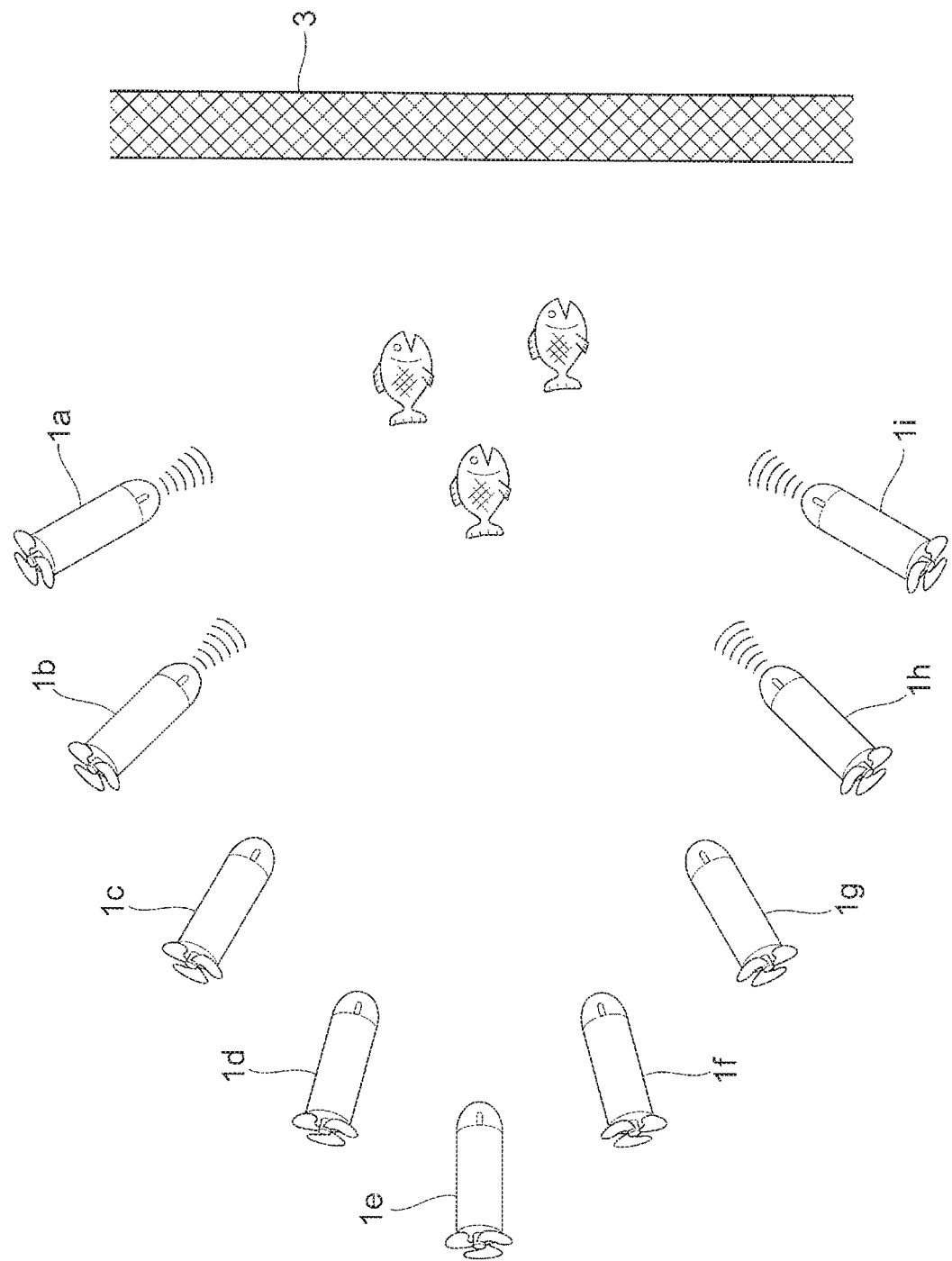

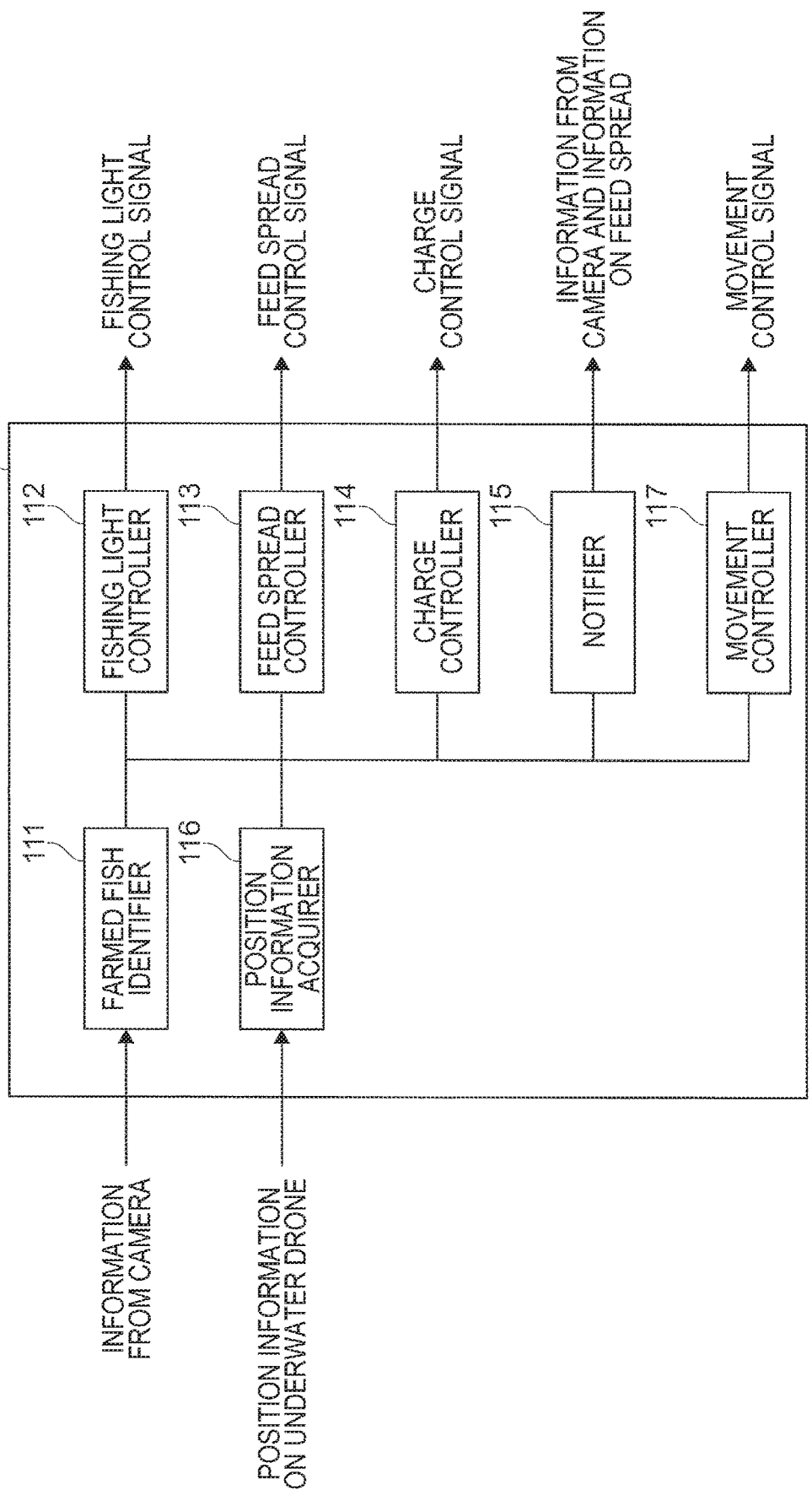

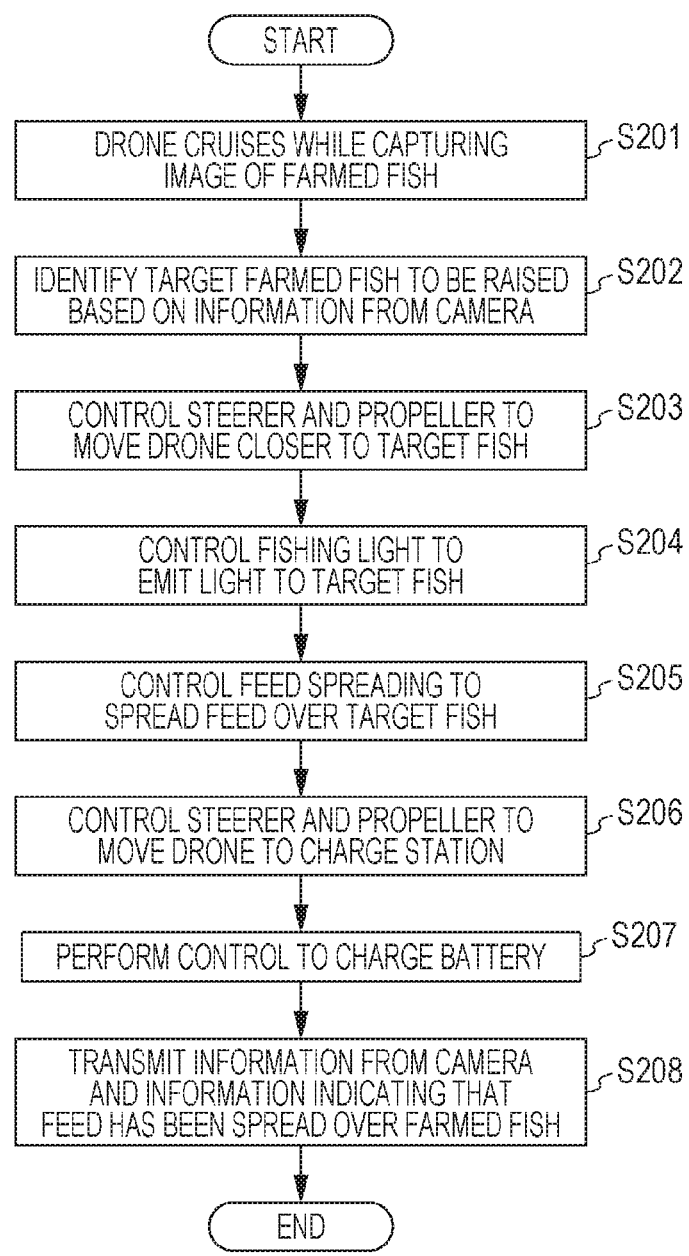

UNDERWATER MOBILE BODY AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-222069 filed Nov. 15, 2016.

BACKGROUND

Technical Field

The present invention relates to an underwater mobile body and a non-transitory computer readable medium.

SUMMARY

According to an aspect of the invention, there is provided an underwater mobile body including: a movement control unit that controls movement underwater; a detection unit that moves underwater under the control of the movement control unit and that detects a position of a fish; and a guidance unit that guides the fish based on the position of the fish detected by the detection unit.

BRIEF DESCRIPTION OF THE DRAWINGS

Exemplary embodiments of the present invention will be described in detail based on the following figures, wherein:

FIG. 5 is an illustration showing an example of formation of multiple underwater drones;

FIG. 9 is a block diagram illustrating an example of a functional configuration of a controller according to the second exemplary embodiment;

FIG. 11 is a flowchart illustrating an example of processing steps executed by the controller according to the second exemplary embodiment.

DETAILED DESCRIPTION

Hereinafter, exemplary embodiments of the present invention will be described in detail with reference to the accompanying drawings.

First Embodiment

Entire Configuration

Figure 1:
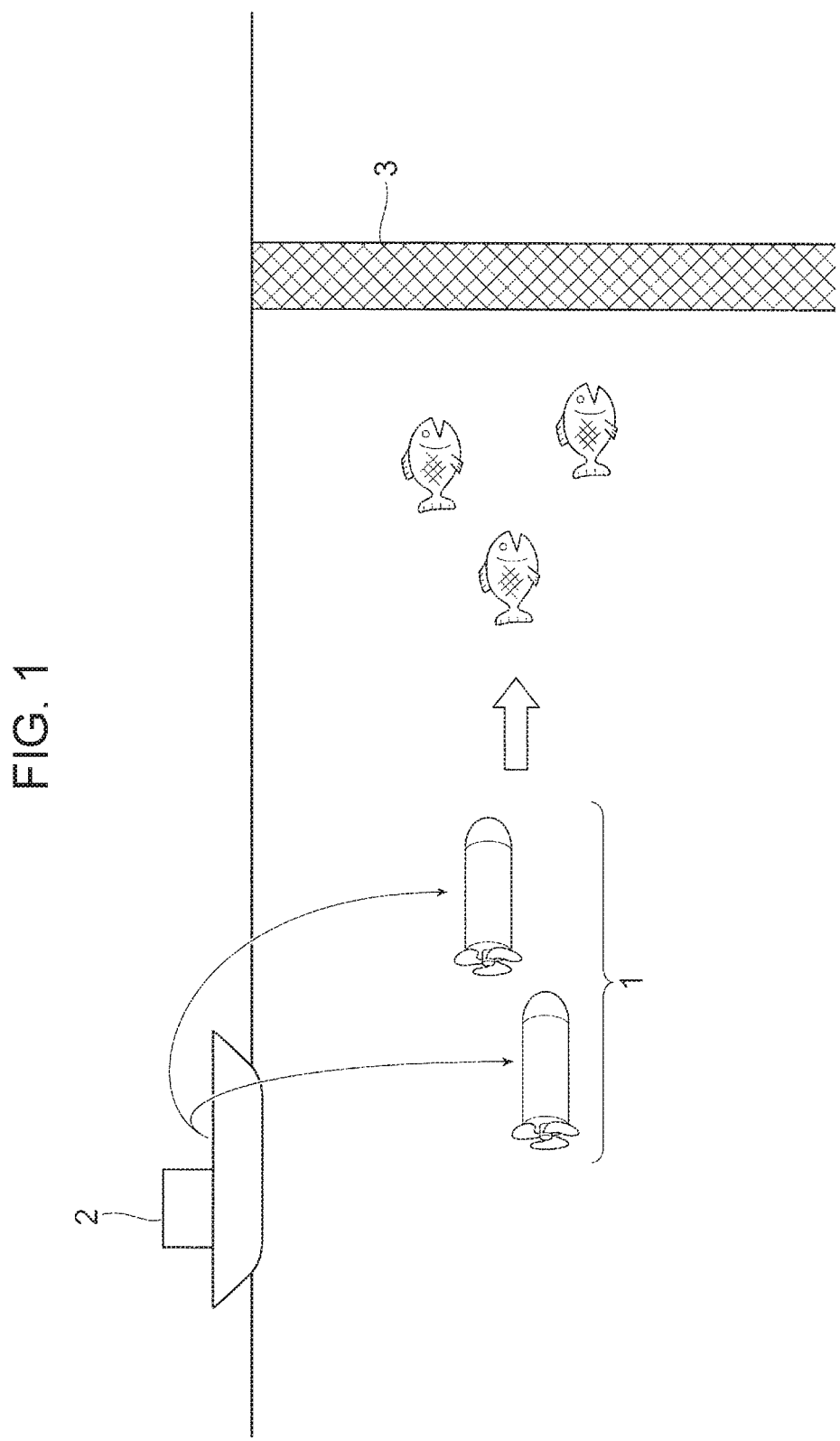
FIG. 1 is an illustration for conceptually explaining an example of the entire configuration according to a first exemplary embodiment.

FIG. 1 is an illustration for conceptually explaining an example of the entire configuration according to a first exemplary embodiment. In the first exemplary embodiment, one or multiple underwater drones 1 are dropped into water from a mother ship 2 which is able to navigate on water. The dropped underwater drones 1 generate guidance transmission waves and navigate to guide a school of fish (fish) in a direction of a fishing net 3 set in advance. After the underwater drones 1 guide a school of fish in the direction of the fishing net 3, for instance, work of pulling the fishing net 3 from the mother ship 2 is done and the school of fish guided into the fishing net 3 is caught.

Thus, the underwater drone 1 according to the first exemplary embodiment supports fishing operations, in other words, catching of fish. It is to be noted that when multiple underwater drone 1 are dropped into water, as describes later, the multiple underwater drone 1 navigate in predetermined formation, and guide a school of fish in a direction of the fishing net 3.

<Configuration of Underwater Drone>

Figure 2:
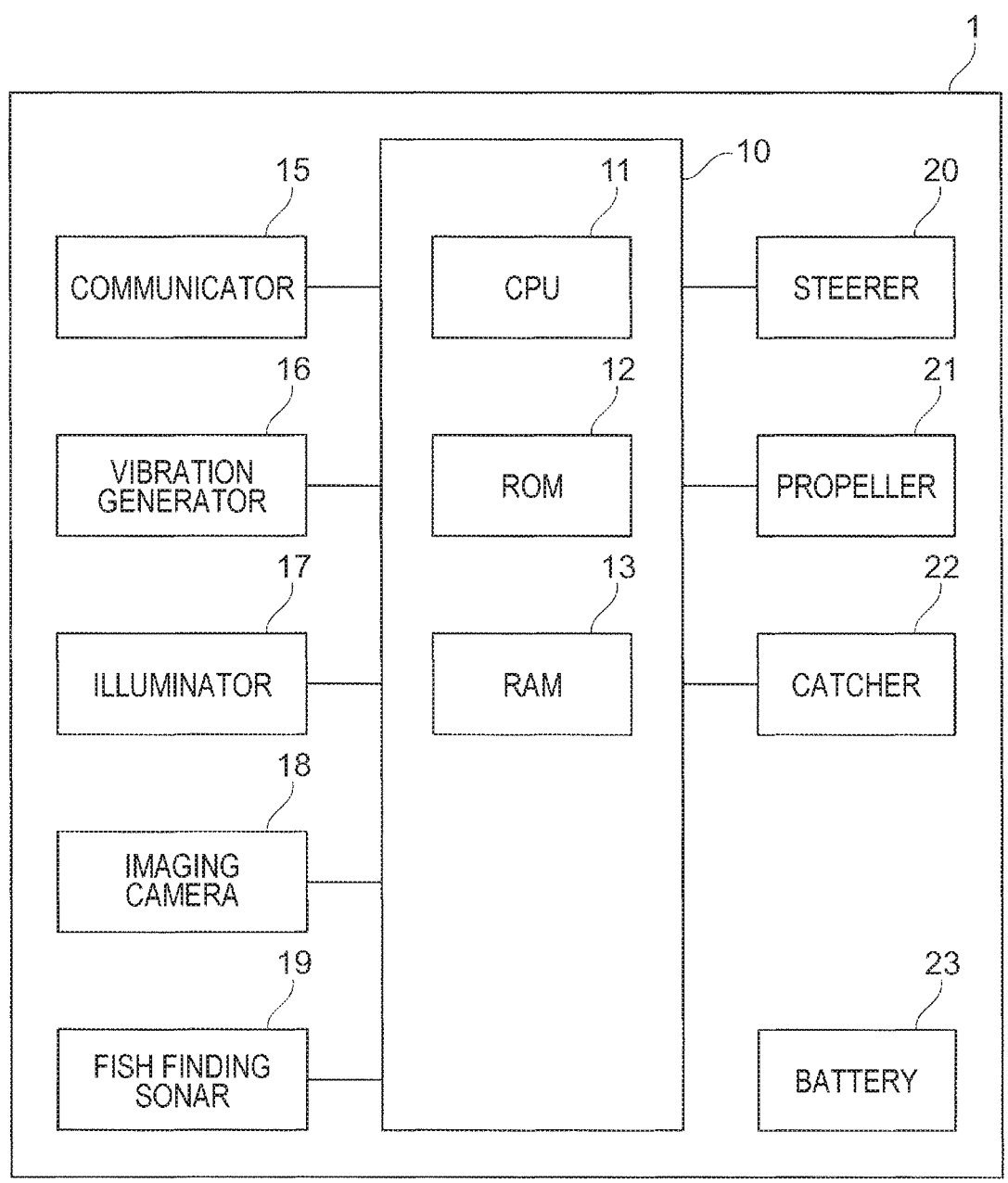
FIG. 2 is a diagram illustrating a configuration example of an underwater drone according to the first exemplary embodiment.

FIG. 2 is a diagram illustrating a configuration example of the underwater drone 1 according to the first exemplary embodiment. The underwater drone 1 is an example of an underwater mobile body, and more specifically, is a type of unmanned underwater mobile body.

In the underwater drone 1 according to this exemplary embodiment, functional units are connected to a controller 10. The functional units including the controller 10 are basically housed in a housing which adopts a waterproof structure. Power is supplied from a battery 21 to the functional units including the controller 10. The battery 21 is an example of a power source, and uses, for instance, a primary battery, a secondary battery and/or a fuel cell. It is to be noted that an internal combustion engine may be used as the power source. It is to be noted that power may be supplied, for instance, from the outside such as the mother ship 2 to the underwater drone 1 via a power cable.

The controller 10 controls the units that configurate the underwater drone 1. The controller 10 is configurated by a central processing unit (CPU) 11, a read only memory (ROM) 12, and a random access memory (RAM) 13. The ROM 12 stores programs to be executed by the CPU 11. The CPU 11 reads a program stored in the ROM 12, and executes the program using the RAM 13 as a work area. The CPU 11 controls the functional units that configurate the underwater drone 1, by the execution of each program.

A communicator 15 transmits and receives radio waves by wireless communication or wired communication, and communicates with other communication devices. Here, the communicator 15 communicates with the mother ship 2 (for instance, a communication apparatus provided in the mother ship 2) on water, and other underwater drones 1 (hereinafter other underwater drones 1 other than the drone 1 are referred to as "other drones") which are present underwater. As further described below, when communicating with the mother ship 2, the communicator 15 performs wireless communication or wired communication via a communication cable. On the other hand, when communicating with other drones which are present underwater, the communicator 15 performs wireless communication.

Here, when performing wireless communications, the communicator 15 uses radio waves with a wavelength of 10 km or longer and 100 km or shorter, called very low frequency radio waves. In the case of very low frequency radio waves, the underwater transmission distance is approximately 10 m. It is to be noted that when radio waves with a wavelength of 100 km or longer and 1,000 km or shorter, called extremely low frequency radio waves are used for wireless communication, the underwater transmission distance is approximately 100 m. However, the transmission distance varies depending on whether communication is performed in fresh water or sea water, and is affected by the presence of wave on the surface of water, the presence of turbidity and a water temperature.

The communicator 15 may use sound waves for wireless communication. In general, the transmission distance underwater of sound waves is several 100 to several 1,000 m, and may reach 10,000 m. In the case of this exemplary embodiment, radio waves or sound waves are used according to a distance between the underwater drone 1 and another communication device. For instance, when wireless communication is performed between the underwater drone 1 and the mother ship 2, radio waves are used in a shallow water area, and sound waves are used in a deep water area.

The vibration generator 16 is a vibration generation device that generate guidance transmission waves for guiding a school of fish in a direction of the fishing net 3. The guidance transmission waves are, for instance, sound waves which stimulate fish and which are not favored by fish, and examples may include sound waves with a frequency of around 100 hertz (Hz), or sound waves with a sound pressure level of 100 decibels (dB) or greater.

An illuminator 17 is provided to illuminate an operating range of the underwater drone 1. As the illuminator 17, for instance, a halogen lamp, a white light emitting diode (LED) or a color LED is used.

An imaging camera 18 is provided to capture an image of the operating range of the underwater drone 1 and the surroundings of the underwater drone 1. The imaging camera 18 may be a camera that captures a still image or a camera that captures a dynamic image. A captured image is stored in the RAM 13, for instance. Although the details will be described later, still images and/or dynamic images captured by the imaging camera 18 are used to identify other devices and schools of fish which are present in the surroundings of the underwater drone 1. Hereinafter, information on the still images and dynamic images captured by the imaging camera 18 may be collectively referred to as "camera information".

A fish detection sonar 19 detects an underwater school of fish utilizing ultrasonic waves. The fish detection sonar 19 obtains information on, for instance, the position of a school of fish, the distance from the underwater drone 1 to a school of fish, the movement direction of a school of fish, the movement speed of a school of fish, the size of a school of fish (volume of fish catches), and the type of fish in a school of fish. The obtained information on a school of fish is stored in the RAM 13, for instance.

The steerer 20 is used for changing the movement direction of the underwater drone 1. The movement direction is controlled in accordance with a program executed by remote control or the controller 10. The movement direction includes not only a direction in a horizontal plane, but also a vertical direction (a surfacing direction and a descending direction). A propeller 21 is configured by, for instance, a propeller and a motor that rotates the propeller. The motor has a watertight structure to protect the inside from rusting.

A catcher 22 is provided to directly catch fish by the underwater drone 1. Examples of the catcher 22 may include an arm, a harpoon, and a fishing net for catching fish.

In this exemplary embodiment, the imaging camera 18, the fish detection sonar 19 are each used as an example of the detection unit. Also, the vibration generator 16 is used as an example of the guidance unit.

<Functional Configuration of Controller>

Figure 3:
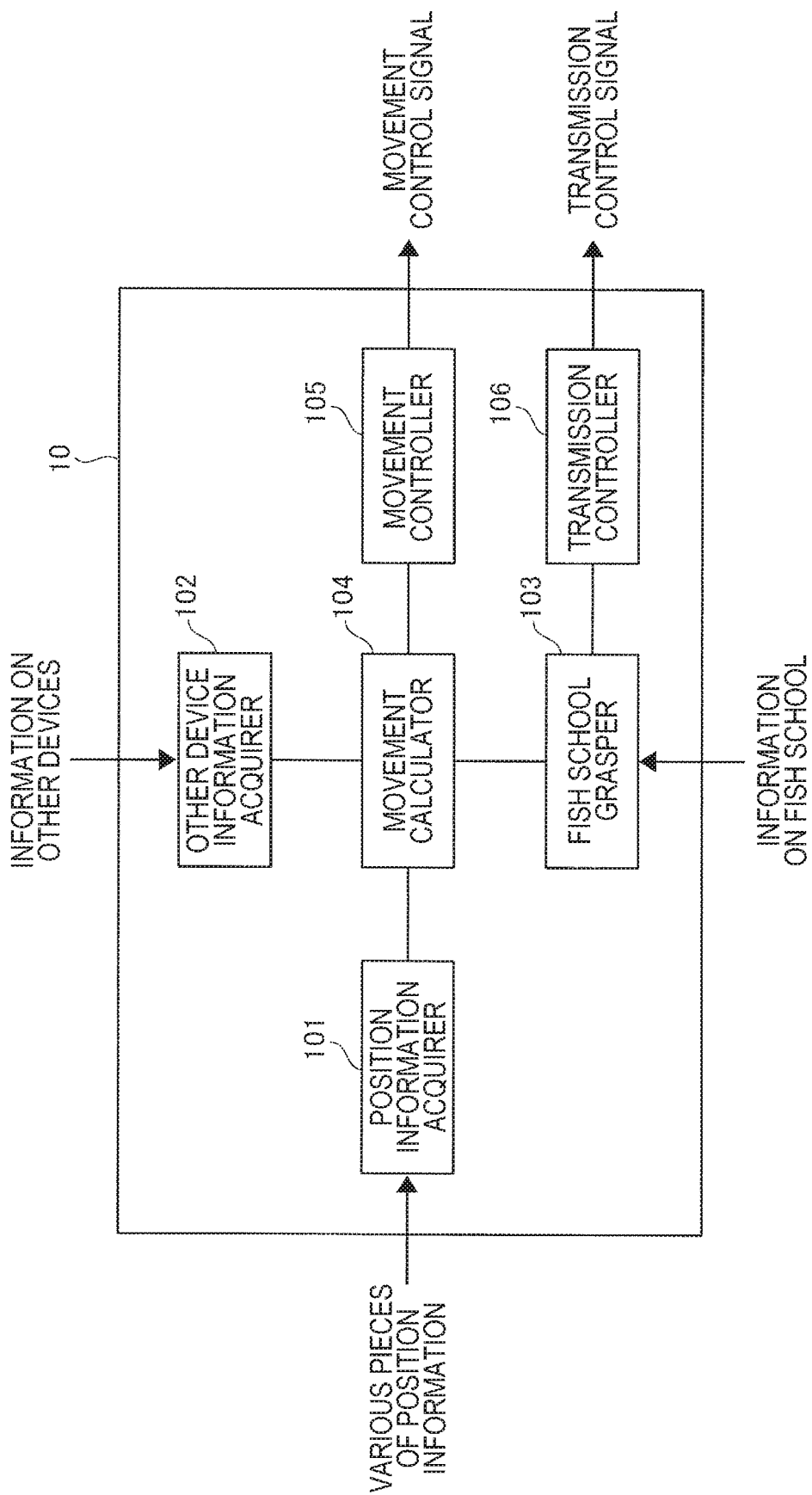
FIG. 3 is a block diagram illustrating an example of a functional configuration of a controller according to the first exemplary embodiment.

Next, the functional configuration of the controller 10 will be described. FIG. 3 is a block diagram illustrating an example of the functional configuration of the controller 10 according to the first exemplary embodiment. The controller 10 includes a position information acquirer 101, other device information acquirer 102, a fish school grasper 103, a movement calculator 104, a movement controller 105, and a transmission controller 106.

The position information acquirer 101 acquires various position information. More specifically, the position information acquirer 101 acquires position information (hereinafter referred to as "drop position information") indicating a position at which the underwater drone 1 is dropped into water, position information (hereinafter referred to as "fishing net position information") indicating a position of the fishing net 3 which has been set, and position information (hereinafter referred to as "fish school position information") indicating a position where a school of fish is detected. These pieces of information are stored in the RAM 13, for instance.

Here, the drop position information is sent, for instance, from the mother ship 2 by wireless communication or wired communication. More specifically, the mother ship 2 obtains drop position information by a global positioning system (GPS), for instance, at a location where the underwater drone 1 is dropped. The drop position information is transmitted from the mother ship 2 to the underwater drones 1 before the underwater drones 1 are dropped into water, or before the dropped drones 1 start to move underwater. It is to be noted that for instance, the underwater drones 1 themselves may obtain the drop position information by a GPS before being dropped into water.

Similarly, fishing net position information is also transmitted, for instance, from the mother ship 2 by wireless communication or wired communication. More specifically, for instance, the mother ship 2 obtains the fishing net position information by a GPS at a location where the fishing net 3 is set. The fishing net position information is transmitted from the mother ship 2 to the underwater drones 1 before the underwater drones 1 are dropped into water, or after the underwater drones 1 are dropped. It is to be noted that it is not necessarily that the mother ship 2 obtains the fishing net position information by a GPS, but for instance, a crew of the mother ship 2 may input the fishing net position information to a communication device of the mother ship 2 or the underwater drones 1.

Similarly, the fishing net position information is also transmitted, for instance, from the mother ship 2 by wireless communication or wired communication. More specifically, for instance, a fish detector mounted on the mother ship 2 detects a school of fish, and obtains position information (fish school position information) on the school of fish. The fish school position information is transmitted from the mother ship 2 to the underwater drones 1 before each underwater drone 1 is dropped into water, or after each underwater drone 1 is dropped. Alternatively, the mother ship 2 may detect schools of fish by a fish detector regularly, for instance, and may transmit fish school position information to each underwater drone 1 that navigate underwater. Furthermore, for instance, the fish detection sonar 19 of the underwater drone 1 may obtain fish school position information.

The other device information acquirer 102 exchanges with other drones in the surroundings of the underwater drone 1 by near field wireless communication using very low frequency radio waves, and acquires information on the other drones. Here, the other device information acquirer 102 acquires, for instance, position information on other drones, and information on the movement speed and the movement direction set by the other drones. In addition, the other device information acquirer 102 acquires information on the distance between the underwater drone 1 and other drones, for instance, by transmitting radio waves or sound waves to the other drones. In addition, the other device information acquirer 102 acquires information on the others drones based on the information obtained by the imaging camera 18. For instance, the other device information acquirer 102 acquires information on the positions and the movement directions of other drones and the distances between the underwater drone 1 and other drones based on the captured still images of others drones.

The fish school grasper 103 as an example of the detection unit grasps information on a school of fish based on the camera information obtained by the imaging camera 18 and the information obtained by the fish school detection sonar 19. More specifically, the fish school grasper 103 grasps information on the position of a school of fish, the distance from the underwater drone 1 to a school of fish, the movement direction of a school of fish, the movement speed of a school of fish, the size of a school of fish, and the type of fish in a school of fish based on, for instance, the still images captured by the imaging camera 18 and the information of the fish school detection sonar 19.

It is to be noted that the fish school grasper 103 may obtain the camera information and the information of the fish school detection sonar 19 of the other drones in addition to the camera information and the information of the fish school detection sonar 19 of the underwater drone 1. The position of a school of fish, the size of a school of fish, and the type of fish in a school of fish are more accurately grasped by collecting the information on the underwater drone 1 and the other drones.

The movement calculation unit 104 calculates a movement direction and a movement speed to be followed by the underwater drone 1 based on the drop position information, the fishing net position information, and the fish school position information acquired by the position information acquirer 101. More specifically, for instance, the movement calculator 104 holds a map of a fishing water area, and predicts a movement path (position of a school of fish), on the map, of a school of fish that moves from the position indicated by the fish school position information, in consideration of the movement direction and the movement speed of the school of fish. The movement calculator 104 then calculates a movement direction and a movement speed to be followed by the underwater drone 1 for moving the underwater drone 1 closer to the school of fish starting from the position where the underwater drone 1 is dropped. For instance, after the underwater drone 1 approaches the school of fish and the distance d between the underwater drone 1 and a school of fish has reached a predetermined distance d1, the movement calculator 104 calculates a movement direction and a movement speed to be followed by the underwater drone 1 so as to guide the school of fish in a direction of the fishing net 3 while identifying the movement of the school of fish.

It is to be noted that when multiple underwater drones 1 are dropped, the movement calculator 104 adjusts a movement direction and a movement speed of each underwater drone 1 based on the information on other drones acquired by the other drone information acquirer 102 so that the multiple underwater drones 1 navigate in predetermined formation.

The movement controller 105 as an example of the movement control unit generates a control signal (movement control signal) based on the movement direction and movement speed calculated by the movement calculator 104, and controls the steerer 20 and the propeller 21.

The transmission controller 106 as an example of the guidance unit generates a control signal (transmission control signal) based on the information on a school of fish grasped by the fish school grasper 103, and controls the vibration generator 16 to generate guidance transmission waves. In other words, the transmission controller 106 generates guidance transmission waves destined to the school of fish, and guides the school of fish in a direction in which the school of fish moves away from the underwater drone 1.

Here, for instance, when the fish school grasper 103 grasps the situation that the underwater drone 1 has approached the school of fish until the distance d between the underwater drone 1 and the school of fish reaches a predetermined distance d2, the transmission controller 106 generates guidance transmission waves. Also, for instance, when the fishing net 3 is present on the extension line of the school of fish in a direction from the underwater drone 1 to the school of fish, the transmission controller 106 generates guidance transmission waves which move toward the school of fish, and guides the school of fish in a direction of the fishing net 3. In addition, the transmission controller 106 adjusts the intensity of guidance transmission waves according to the distance between the underwater drone 1 and the school of fish, and adjusts the direction of guidance transmission waves so as to irradiate the school of fish with the guidance transmission waves.

Example of Catching School of Fish Using Underwater Drones

Figure 4A:
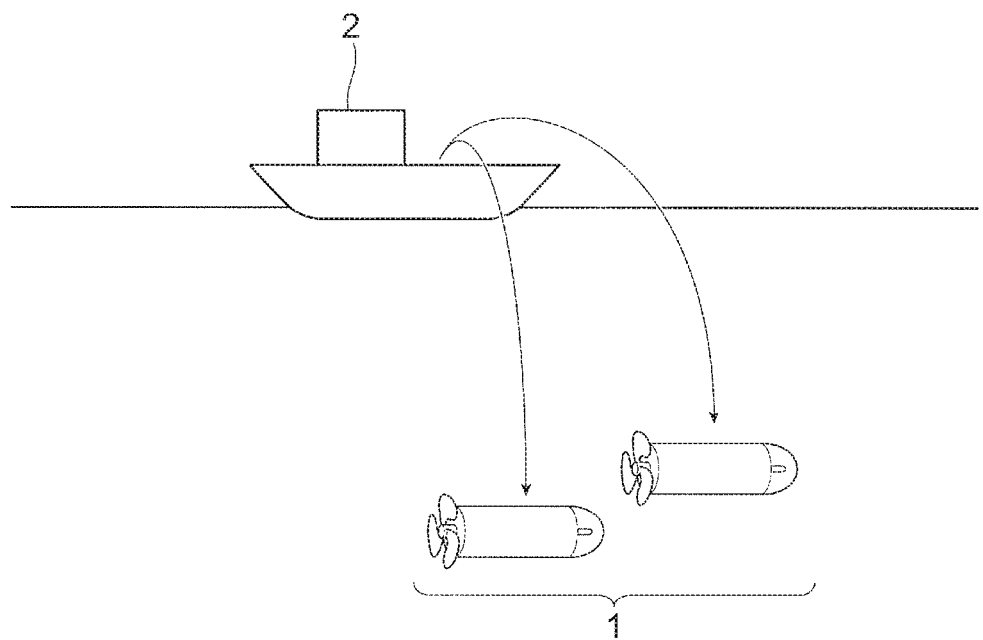
FIGS. 4A and 4B are illustrations for explaining an example of catching a school of fish using underwater drones.
Figure 4B:
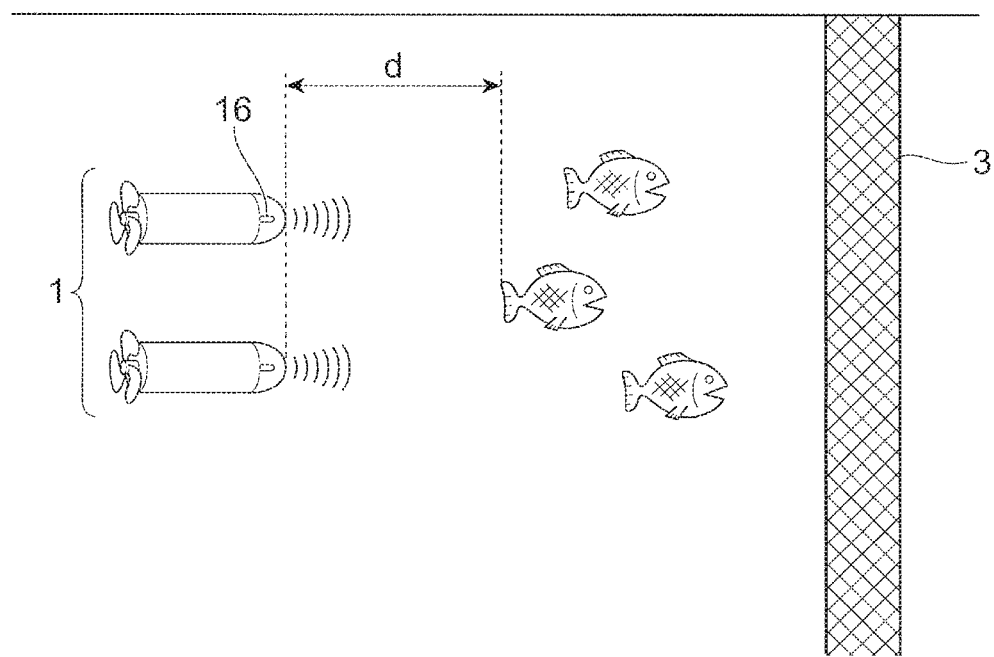

Next, an example of catching a school of fish using the underwater drone 1 will be described. FIGS. 4A and 4B are illustrations for explaining an example of catching a school of fish using the underwater drones 1.

First, the mother ship 2 detects a school of fish by a fish detector, and moves to a fishing water area based on the information on the detected school of fish. When the mother ship 2 arrives at a fishing water area, as illustrated in FIG. 4A, a crew of the mother ship 2 drops one or multiple underwater drones 1 into water. Here, the underwater drone 1 is dropped into water with data exchangeable between the underwater drone 1 and the mother ship 2 by wireless communication or wired communication. As additional description, before each underwater drone 1 is dropped into water, or after each underwater drone 1 is dropped, the position information acquirer 101 acquires the drop position information, the fishing net position information, and the fish school position information from the mother ship 2. As described above, the underwater drone 1 itself may obtain these pieces of position information.

Next, the movement calculator 104 calculates a movement direction and a movement speed to be followed by the underwater drone 1 based on the drop position information, the fishing net position information, and the fish school position information. Here, the movement calculator 104 first calculates a movement direction and a movement speed so that the underwater drone 1 approaches a target school of fish.

More specifically, for instance, the movement calculator 104 predicts a movement path, on the map, of a school of fish that moves from the position indicated by the fish school position information, in consideration of the movement direction and the movement speed of the school of fish. The movement calculator 104 then calculates a movement direction and a movement speed of the underwater drone 1 for moving the underwater drone 1 closer to the school of fish starting from the position where the underwater drone 1 is dropped. In addition, the movement controller 105 controls the steerer 20 and the propeller 21 based on the movement direction and the movement speed calculated by the movement calculator 104.

Also, during navigation of the underwater drone 1, the fish school grasper 103 grasps information on a target school of fish based on the camera information and the information of the fish school detection sonar 19. As illustrated in FIG. 4B, when the underwater drone 1 approaches a target school of fish and the distance d between the underwater drone 1 and the target school of fish has reached a predetermined distance d1, the movement calculator 104 calculates a movement direction and a movement speed of the underwater drone 1 so as to guide the school of fish in a direction of the fishing net 3. In other words, the movement calculator 104 calculates a movement direction and a movement speed of the underwater drone 1 so as to guide the school of fish to the position of the fishing net 3 indicated by the fishing net position information.

As further described below, since the movement direction and speed of the school of fish change, the underwater drone 1 navigates underwater while adjusting the movement direction and the movement speed of the underwater drone 1. As additional description, during navigation of the underwater drone 1, the movement calculator 104 updates a predicted movement path (position of the school of fish) of the school of fish, and for instance, regularly calculates a movement direction and a movement speed. It is to be noted that the current position of the underwater drone 1 is identified by, for instance, a movement path from the position where the underwater drone 1 has been dropped. Alternatively, the mother ship 2 may identify the current position of the underwater drone 1, for instance, by using radio waves or sound waves underwater, and may transmit the identified position information to the underwater drone 1.

Also, as illustrated in FIG. 4B, when the underwater drone 1 approaches a target school of fish and the distance d between the underwater drone 1 and the target school of fish has reached a predetermined distance d2, the transmission controller 106 controls the vibration generator 16 to generate guidance transmission waves. The transmission control unit 106 adjusts the intensity of guidance transmission waves, for instance, by increasing the intensity for a longer distance between the underwater drone 1 and the school of fish, or decreasing the intensity for a shorter distance between the underwater drone 1 and the school of fish. Also, the transmission controller 106 adjusts the direction of guidance transmission waves so as to irradiate the school of fish with the guidance transmission waves.

Here, when multiple underwater drones 1 are dropped, the multiple underwater drones 1 form formation so as to surround a school of fish, for instance. FIG. 5 is an illustration showing an example of a formation of multiple underwater drones. In the example illustrated in FIG. 5, nine underwater drones 1 (underwater drones 1a to 1i) navigate in a formation. More specifically, nine underwater drones 1 stay in formation of three-dimensional inverted V, and guide a school of fish in a direction of the fishing net 3.

Here, the movement calculator 104 of each underwater drone 1 adjusts the movement direction and the movement speed of the underwater drone 1 based on the information on other drones acquired by the other drone information acquirer 102 so that the nine underwater drones 1 navigate in formation of three-dimensional inverted V. As further described below, using near field wireless communication, the underwater drones 1 exchange information such as the movement direction and movement speed, the position information of each underwater drone 1, and the distance between each underwater drone 1 and other underwater drones 1. The underwater drones 1 each adjust the movement speed and the movement direction of each underwater drone 1 based on the acquired information on other underwater drones 1, and navigate in formation of three-dimensional inverted V.

Alternatively, one of multiple underwater drones 1 may be selected as the parent drone that serves as the commanding drone. In the example illustrated in FIG. 5, for instance, the underwater drone 1e is set as the parent drone. In this case, for instance, the underwater drone 1e instructs each of other underwater drones 1 to have a movement speed and a movement direction in order to stay in formation, or to keep a space between the underwater drone 1 and surrounding underwater drones 1. For instance, the underwater drone 1e collects the camera information and the information of the fish school detection sonar 19 of the other underwater drones 1, and grasps the information on a school of fish.

It is to be noted that although all of the multiple underwater drones 1 may transmit guidance transmission waves, only part of the multiple underwater drones 1 may transmit guidance transmission waves. In the example illustrated in FIG. 5, the underwater drones 1 (the underwater drones 1a, 1b, 1h and 1i) on the outermost side (outer side) of the formation of three-dimensional inverted V transmit guidance transmission waves.

Alternatively, the formation may be changed according to the type of fish in a school of fish or the size of a school of fish. For instance, the formation for each type of fish is set in advance, such as "formation of three-dimensional inverted V in the case of a school of sardine" or "formation of three-dimensional inverted W in the case of a school of tuna". The multiple underwater drones 1 navigate in formation according to a type of fish in a target school of fish. Similarly, the formation may be set in advance according to the size of a school of fish. In addition, the formation may be changed according to the size of a school of fish, for instance, by increasing the space between the underwater drones 1 for a larger school of fish or decreasing the space between the underwater drones 1 for a smaller school of fish.

Alternatively, when the type of fish in a school of fish grasped by the fish school grasper 103 is not the aimed fish type or when the size of a school of fish grasped is not the aimed size, the underwater drone 1 may change the target school of fish. In this situation, for instance, in the case where fishing is aimed for sea bream, and a school of fish grasped from the camera information indicates herring, the underwater drone 1 may change the target school of fish and continue navigation for another target school of fish. Alternatively, for instance, the underwater drone 1 sets a predetermined aimed size of a school of fish, and in the case where the size of a school of fish grasped from the camera information falls below the predetermined aimed size, the underwater drone 1 may change the target school of fish and continue navigation for another target school of fish.

Alternatively, the fish school grasper 103 may transmit the grasped type of fish in a school of fish and the grasped size of a school of fish to the mother ship 2. The transmission of these pieces of information to the mother ship 2 allows, for instance, a crew of the mother ship 2 to determine a formation according to the type of fish in a school of fish or the size of a school of fish and to determine whether or not a target school of fish is to be changed.

<Collection of Underwater Drone>

Next, a method to collecting an underwater drone 1 dropped underwater will be described. After guidance of a school of fish is completed, the underwater drone 1 navigates in a direction of a net for catching drones. More specifically, the movement calculator 104 calculates a movement direction and a movement speed based on the position information on the position where the net for catching drones is set so that the underwater drone 1 moves in a direction of the net for catching drones. The movement controller 105 then controls the steerer 20 and the propeller 21 based on the movement direction and the movement speed calculated by the movement calculator 104. When the underwater drone 1 arrives near the net for catching drones, the underwater drone 1 is caught by the net for catching drones and is pulled and collected by the mother ship 2.

After guidance of a school of fish is completed, the underwater drone 1 moves near the mother ship 2, compressed gas in a balloon mounted on the underwater drone 1 is released to surface and may be collected by the mother ship 2. Also, the underwater drone 1 may directly move to a fishing port and collected at the fishing port rather than moves to the net for catching drones or the mother ship 2.

Alternatively, the underwater drone 1 may determine whether the underwater drone 1 is to be collected or guidance of a school of fish is continued according to the type or size of a target school of fish. For instance, when the type of a target school of fish is not the aimed fish type, the underwater drone 1 may determine to continue guidance of another school of fish, and may continue navigation for setting another school of fish to a target. In contrast, for instance, when the type of a target school of fish is the aimed fish type, the underwater drone 1 determines that the school of fish is guided to the fishing net 3, and after the guidance of the school of fish, the underwater drone 1 may move near the net for catching drones or the mother ship 2, or a fishing port, and may be collected.

<Processing Steps Executed by Underwater Drone>

Figure 6:
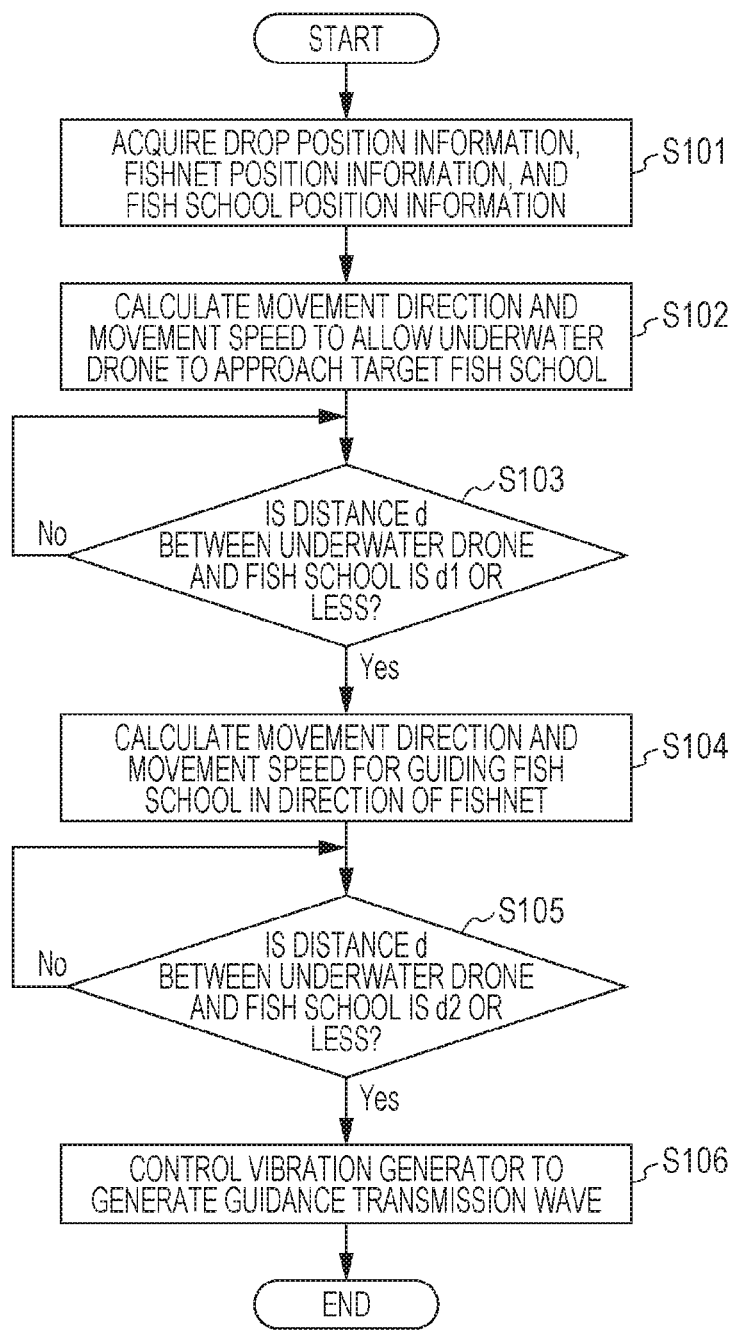
FIG. 6 is a flowchart illustrating an example of processing steps executed by the controller according to the first exemplary embodiment.

Next, the processing steps executed by the controller 10 of the underwater drone 1 according to this exemplary embodiment will be described. FIG. 6 is a flowchart illustrating an example of processing steps executed by the controller 10 according to the first exemplary embodiment.

After the underwater drone 1 is dropped underwater, the position information acquirer 101 acquires the drop position information, the fishing net position information, and the fish school position information (step 101). It is to be noted that the position information acquirer 101 may acquire these pieces of information before the underwater drone 1 is dropped underwater. Next, the movement calculator 104 calculates a movement direction and a movement speed to be followed by the underwater drone 1 based on the drop position information and the fish school position information so that the underwater drone 1 approaches a target school of fish (step 102). In addition, the movement controller 105 controls the steerer 20 and the propeller 21 based on the movement direction and the movement speed calculated by the movement calculator 104. As additional description, during navigation of the underwater drone 1, the controller 10 performs the processing of step 102, for instance, regularly while updating the current position of the underwater drone 1 and a predicted position of a school of fish on the map.

Next, the fish school grasper 103 determines whether or not the distance d between the underwater drone 1 and the target school of fish is a predetermined distance d1 or less based on the camera information and the information of the fish school detection sonar 19 (step 103). When a negative determination (No) is made in step 103, the determination of step 103 is repeatedly performed until the distance between the underwater drone 1 and the target school of fish falls below the predetermined distance d1.

On the other hand, when an affirmative determination (Yes) is made in step 103, the movement calculator 104 calculates a movement direction and a movement speed to be followed by the underwater drone 1 so as to guide the school of fish in a direction of the fishing net 3 (step 104). In addition, the movement controller 105 controls the steerer 20 and the propeller 21 based on the movement direction and the movement speed calculated by the movement calculator 104. As additional description, similarly to the processing of step 102, the processing of step 104 is executed, for instance, regularly during navigation of the underwater drone 1.

Next, the fish school grasper 103 determines whether or not the distance d between the underwater drone 1 and the target school of fish is a predetermined distance d2 or less based on the camera information and the information of the fish school detection sonar 19 (step 105). When a negative determination (No) is made in step 105, the determination of step 105 is repeatedly performed until the distance d between the underwater drone 1 and the target school of fish falls below the predetermined distance d2.

On the other hand, when an affirmative determination (Yes) is made in step 105, the transmission controller 106 controls the vibration generator 16 to generate guidance transmission waves (step 106). When a school of fish is guided into the fishing net 3 by the underwater drone 1, the school of fish is caught by pulling the fishing net 3 from the mother ship 2 or fishing up the guided school of fish. Subsequently, the underwater drone 1 is caught in the net for catching drones or comes to the surface, and is collected. The processing flow is completed.

It is to be noted that in the above-described operations, a series of processing of step 103 and step 104, and a series of processing of step 105 and step 106 may be executed in any order. Also, any magnitude relationship between the distance d1 of step 103 and the distance d2 of step 105 is allowed, and d1 and d2 may be equal, or when d1 and d2 are different, any one of d1 and d2 may be larger.

As described above, the underwater drone 1 according to this exemplary embodiment guide a school of fish in a direction of the fishing net 3 while navigating by irradiating the school of fish with guidance transmission waves. The school of fish guided into the fishing net 3 is caught by doing work of pulling the fishing net 3. The volume of fish catches in fishing is increased, for instance, by using the underwater drone 1 according to this exemplary embodiment.

Also, in this exemplary embodiment, the underwater drone 1 may directly catch the fish guided into the fishing net 3 by the catcher 22. In this case, the underwater drone 1 throws an arm, a harpoon, or a fishing net toward fish which is swimming, for instance, in a predetermined range around the underwater drone 1. Alternatively, the underwater drone 1 may have a unit such as a gun that slows down the movement of fish by stimulating the fish. For instance, the underwater drone 1 may shoot a bullet from a gun to hit fish and slow down the movement of the fish, and subsequently, may catch the fish by the catcher 22.

In addition, in this exemplary embodiment, an underwater drone 1 for transport, which transports caught fish to a fishing port, may be used. In this case, the underwater drone 1 for transport is provided with, for instance, a fishing net for transport of fish. The underwater drone 1 for transport catches fish by the catcher 22, for instance, and houses fish in the fishing net for transport and transports fish to a fishing port. Also, the underwater drone 1 for transport goes back and forth between a fishing port and the fishing nets 3 (or the mother ship 2) to transport fish. In addition, the underwater drone 1 for transport may change a transport destination according to the type of fish in the caught school of fish or the volume of fish catches. For instance, when sardines are caught, the underwater drone 1 for transport transports the sardines to a fishing port which has been predesignated as a transport destination of sardine. It is to be noted that as the underwater drone 1 for transport, an underwater drone of a different type from an underwater drone 1 for fish school guidance may be used, or an underwater drone of the same type may be used.

Also, in this exemplary embodiment, the underwater drone 1 transmits guidance transmission waves which stimulate fish and which are not favored by fish. However, the underwater drone 1 is not necessarily configured to transmit such guidance transmission waves. For instance, the underwater drone 1 may transmit guidance transmission waves which attract fish and favored by fish to guide a school of fish into the fishing net 3. Furthermore, for instance, the underwater drone 1 may transmit light such as ultraviolet wavelength light and may guide a school of fish into the fishing net 3 by utilizing fish behavior (phototaxis) of moving toward light.

Also, in this exemplary embodiment, the underwater drone 1 is dropped from the mother ship 2. However, without being limited to this configuration, the underwater drone 1 may be dropped from a fishing port, for instance. In this case, the underwater drone 1 may exchange various pieces of information with the mother ship 2 (communication device provided in the mother ship 2) as described above, or may exchange various pieces of information with a communication device provided in a fishing port.

Also, in this exemplary embodiment, the movement calculator 104 calculates a movement direction and a movement speed of the underwater drone 1. However, the invention is not limited to this the configuration. For instance, the mother ship 2 may calculate a movement direction and a movement speed of the underwater drone 1, and may transmit the calculated movement direction and movement speed to the underwater drone 1.

Second Exemplary Embodiment

Entire Configuration

Figure 7:
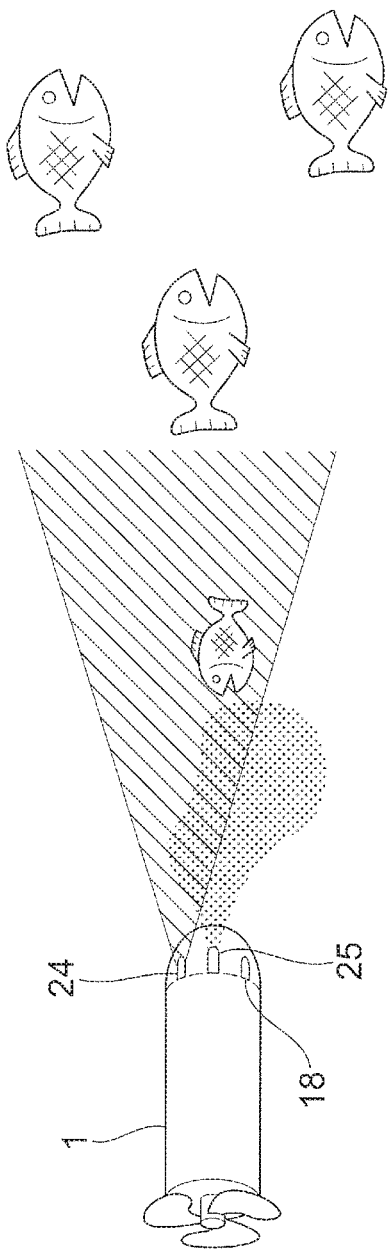
FIG. 7 is an illustration for conceptually explaining an example of the entire configuration according to a second exemplary embodiment.

FIG. 7 is an illustration for conceptually explaining an example of the entire configuration according to a second exemplary embodiment. In the second exemplary embodiment, the underwater drone 1 is dropped underwater in a fish farming area. The underwater drone 1 dropped underwater captures an image of farmed fish by the imaging camera 18, and identifies relatively small farmed fish and farmed fish with a slow swimming speed among farmed fish in a fish farming area. Also, the underwater drone 1 approaches the identified farmed fish, emits light such as ultraviolet wavelength light by a fishing light 24, and guides the farmed fish to the underwater drone 1 utilizing the phototaxis of fish. The underwater drone 1 spreads feed from a feed spreader 25 over the guided farmed fish.

Like this, the underwater drone 1 according to the second exemplary embodiment supports fishing operations, in other words, farming of fish. In this exemplary embodiment, the same components as in the first exemplary embodiment are labeled with the same symbol, and a detailed description thereof is omitted.

<Configuration of Underwater Drone>

Figure 8:
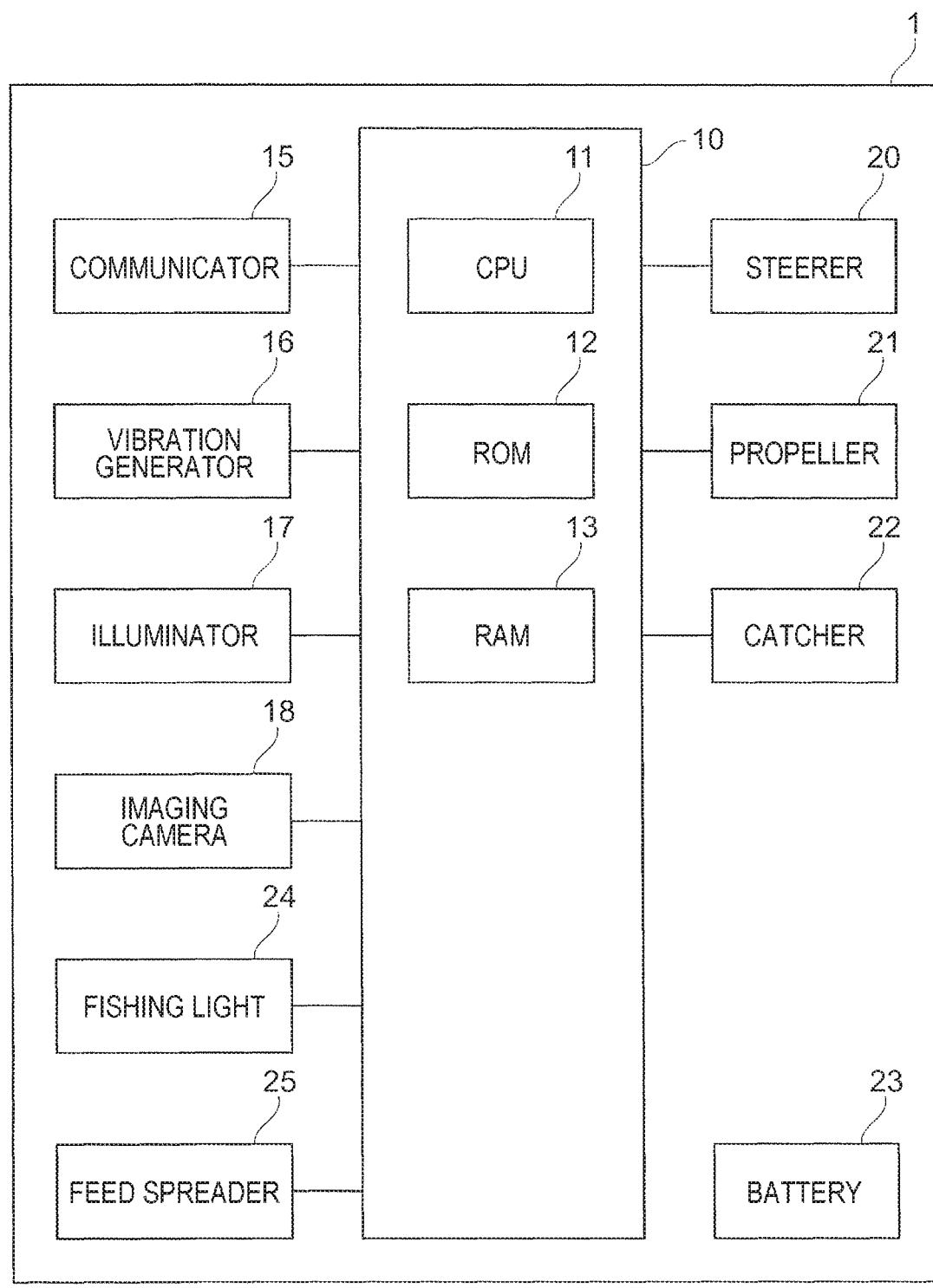
FIG. 8 is a diagram illustrating a configuration example of an underwater drone according to the second exemplary embodiment.

FIG. 8 is a diagram illustrating a configuration example of the underwater drone 1 according to the second exemplary embodiment. The underwater drone 1 according to this exemplary embodiment differs from the underwater drone 1 illustrated in FIG. 2 in that the fish school detection sonar 19 is not used, but the fishing light 24 that emits light such as ultraviolet wavelength light and the feed spreader 25 that spreads feed are used.

The fishing light 24 emits light for guiding farmed fish to the underwater drone 1. As the fishing light 24, any light may be used as long as the light emits light that attracts farmed fish, and for instance, a halogen lamp, a white LED or a color LED is used. The feed spreader 25 spreads feed over farmed fish. The feed spreader 25 is configurated by, for instance, a tank that stores feed for farmed fish, a sending device that sucks feed from the tank and sends the feed underwater, and a motor that drives the sending device. The motor has a watertight structure to protect the inside from rusting.

In this exemplary embodiment, the imaging camera 18 is used as an example of the detection unit. Also, the fishing light 24 is used as an example of the guidance unit. Furthermore, the feed spreader 25 is used as an example of the feed spread unit.

<Functional Configuration of Controller>

Next, the functional configuration of the controller 10 will be described. FIG. 9 is a block diagram illustrating an example of the functional configuration of the controller 10 according to the second exemplary embodiment. The controller 10 includes a farmed fish identifier 111, a fishing light controller 112, a feed spread controller 113, a charge controller 114, a notifier 115, a position information acquirer 116, and a movement controller 117.

Here, the controller 10 controls each of functional units in three operation modes (operation styles): observation mode, support mode, and charge mode. The observation mode is a mode in which an image of farmed fish in a fish farming area is captured and the farmed fish is observed. The support mode is a mode in which farming of fish is supported by guiding farmed fish and spreading feed over the farmed fish. The charge mode is a mode in which the battery 23 is charged. The controller 10 operates in each of the observation mode, the support mode, and the charge mode for a predetermined number of times per day, for instance, and performs automatic support for farming.

The farmed fish identifier 111 as an example of the detection unit identifies the farmed fish to be nurtured in the observation mode. Here, the farmed fish identifier 111 identifies the location of farmed fish that satisfies a condition (predetermined condition) for fish to be nurtured based on the camera information obtained by the imaging camera 18. For instance, poorly farmed fish and unhealthy farmed fish such as farmed fish relatively smaller than other farmed fish and farmed fish with a slow swimming speed are identified as the fish to be nurtured from the farmed fish in a fish farming area.

More specifically, relatively small farmed fish is identified, for instance, by comparing the sizes of farmed fish with the same distance from the underwater drone 1. For instance, when the distance from the underwater drone 1 to farmed fish, and the size of the farmed fish on a still image are grasped, it is also possible to estimate the actual size of the farmed fish. In this manner, the farmed fish identifier 111 identifies relatively small farmed fish as the fish to be nurtured from the farmed fish in a fish farming area by comparing the sizes of farmed fish. Alternatively, the farmed fish identifier 111 may identify farmed fish with a size smaller than a predetermined threshold as the fish to be nurtured.

Similarly, farmed fish with a relatively slower speed is identified, for instance, by comparing the swimming speeds of the farmed fish with the same distance from the underwater drone 1. For instance, when the distance from the underwater drone 1 to farmed fish, and the speed of the farmed fish on a dynamic image are grasped, it is also possible to estimate the actual speed of the farmed fish. In this manner, the farmed fish identifier 111 identifies relatively slower farmed fish as the fish to be nurtured from the farmed fish in a fish farming area by comparing the speeds of the farmed fish. Alternatively, the farmed fish identifier 111 may identify farmed fish with a speed slower than a predetermined speed as the fish to be nurtured. It is to be noted that the distance from the underwater drone 1 to the farmed fish is measured, for instance, by transmitting radio waves and sound waves to the farmed fish.

In the support mode, the fishing light controller 112 as an example of the guidance unit generates a control signal (fishing light control signal) and controls the fishing light 24 so as to emit light to the identified farmed fish (hereinafter referred to as target fish) to be nurtured by the farmed fish identifier 111. In other words, the fishing light controller 112 controls the fishing light 24 to emit light to the target fish so that the target fish is guided in a direction closer to the underwater drone 1.

Here, for instance, when the underwater drone 1 approaches the target fish and the distance d between the underwater drone 1 and the target fish has reached a predetermined distance d3, the fishing light controller 112 performs control to emit light to the target fish. Alternatively, the fishing light controller 112 may adjust the intensity of light according to the distance between the underwater drone 1 and the target fish. The fishing light controller 112 adjusts the intensity of light, for instance, by increasing the intensity for a longer distance between the underwater drone 1 and the target fish, or decreasing the intensity for a shorter distance between the underwater drone 1 and the target fish.

In the support mode, the feed spread controller 113 as an example of the feed spread unit generates a control signal (feed spread control signal) and controls the feed spreader 25 so as to spread feed over the target fish guided to the underwater drone 1. Here, for instance, when the underwater drone 1 approaches the target fish and the distance d between the underwater drone 1 and the target fish has reached a predetermined distance d4, the feed spread controller 113 performs control to spread feed over the target fish. Alternatively, the feed spread controller 113 may change an amount of feed to be spread according to the size and swimming speed of the target fish and the distance between the underwater drone 1 and the target fish, for instance. In addition, the feed spread controller 113 may adjust the direction in which feed is spread according to the position of the target fish, for instance.

In the charge mode, the charge controller 114 generates a control signal (charge control signal) and controls charging of the battery 23 so as to charge the battery 23. Here, charging of the battery 23 is performed by a charge station (not illustrated) which is installed on the water surface or under water. The charge station is provided with a charging device that stores electric charge by flowing a current into the battery 23.

In the charge mode, the notifier 115 transmits the camera information obtained by the imaging camera 18 and information on feed spread over the farmed fish to an external central administration server (not illustrated) by wireless communication or wired communication.

The position information acquirer 116 acquires position information on the underwater drone 1 transmitted by a buoy (not illustrated) installed at an end of a fish farming area. It is to be noted that the buoy identifies the current position of the underwater drone 1, for instance, by using radio waves or sound waves underwater.

In the observation mode and the support mode, the movement controller 117 as an example of the movement control unit generates a control signal (movement control signal) for controlling the movement direction and the movement speed of the underwater drone 1, and controls the steerer 20 and the propeller 21. More specifically, in the observation mode, the movement controller 117 controls the steerer 20 and the propeller 21 in accordance with a program so that the underwater drone 1 autonomously navigates in a fish farming water area. Here, the movement controller 117 controls the movement direction and the movement speed of the underwater drone 1 based on, for instance, the position information on the underwater drone 1 acquired by the position information acquirer 116. In addition, in the support mode, the movement controller 117 controls the steerer 20 and the propeller 21 to follow and approach the target fish. When spreading of feed over the target fish is completed, the movement controller 117 controls the steerer 20 and the propeller 21 to move the underwater drone 1 to the charge station.

Example of Nurturing of Farmed Fish Using Underwater Drone

Figure 10A:
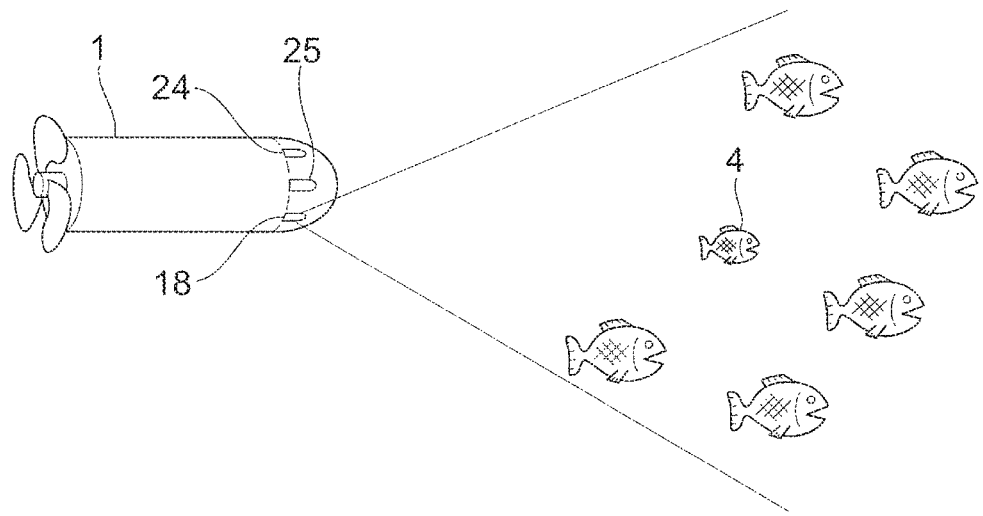
FIGS. 10A to 10C are illustrations for explaining an example of nurturing of farmed fish using an underwater drone.
Figure 10B:
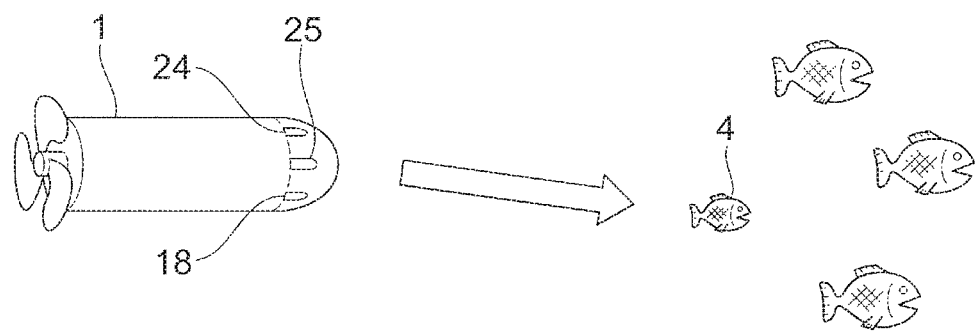
Figure 10C:
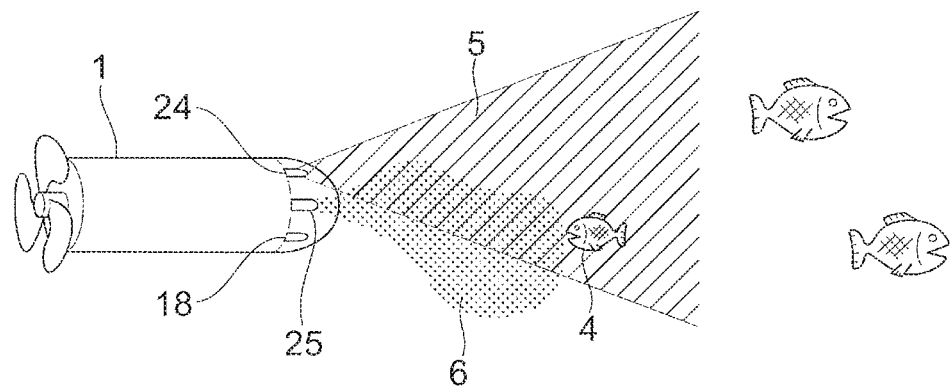

Next, an example of nurturing of farmed fish using the underwater drone 1 will be described. FIGS. 10A to 10C are illustrations for explaining an example of nurturing of farmed fish using the underwater drone 1.

First, as illustrated in FIG. 10A, in the observation mode, the underwater drone 1 navigates while capturing an image of the farmed fish in a fish farming area by the imaging camera 18. Here, the farmed fish identifier 111 identifies the farmed fish to be nurtured based on the camera information obtained by the imaging camera 18. For instance, the farmed fish identifier 111 identifies relatively small farmed fish as the fish to be nurtured out of multiple pieces of farmed fish captured based on a still image of the surroundings of the underwater drone 1, obtained by the imaging camera 18. In the example illustrated in FIG. 10A, farmed fish 4 is identified as the fish to be nurtured.

Next, the underwater drone 1 makes transition from the observation mode to the support mode. When transition is made to the support mode, as illustrated in FIG. 10B, the movement controller 117 controls the steerer 20 and the propeller 21 to follow and approach the farmed fish 4. Also, as illustrated in FIG. 10C, when the underwater drone 1 approaches the farmed fish 4 and the distance d between the underwater drone 1 and the farmed fish 4 has reached the predetermined distance d3, the fishing light controller 112 controls the fishing light 24 to emit light 5 to the farmed fish 4. Furthermore, when the underwater drone 1 approaches the farmed fish 4 and the distance d between the underwater drone 1 and the farmed fish 4 has reached the predetermined distance d4, the feed spread controller 113 controls the feed spreader 25 to spread feed 6 over the farmed fish 4.

When spreading of feed over the farmed fish 4 is completed, the underwater drone 1 moves to the charge station. When the underwater drone 1 arrives at the charge station, transition is made from the support mode to the charge mode. The charge controller 114 performs control to charge the battery 23. Also, the notifier 115 transmits the camera information and information indicating that feed has been spread over the farmed fish 4 to the central administration server. When charging is completed, the underwater drone 1 makes transition from the charge mode to the observation mode, and continues to spread the feed over the farmed fish. It is to be noted that after the spreading of feed over the farmed fish 4 is completed, when the battery 23 has still a capacity to store electricity, in other words, when the remaining capacity to store electricity is greater than or equal to a threshold, transition may be made to the observation mode rather than to the charge mode.

Here, when the farmed fish to be nurtured is identified based on the camera information, then transition is made from the observation mode to the support mode, it may be not possible to determine that the identified farmed fish belongs to which fish farming area. Also, when transition is made from the observation mode to the support mode, the identified farmed fish may have already moved to a position which does not allows the underwater drone 1 to be identified. Thus, a label, on which a number to identify each farmed fish uniquely is marked, may be attached to each farmed fish. In this case, the underwater drone 1 identifies the number of the farmed fish to be nurtured in the observation mode. When transition is made from the observation mode to the support mode, the underwater drone 1 searches for the farmed fish to which a label with the identified number is attached, and spreads feed over the farmed fish.

<Processing Steps Executed by Underwater Drone>

Next, the processing steps executed by the controller 10 of the underwater drone 1 according to this exemplary embodiment will be described. FIG. 11 is a flowchart illustrating an example of processing steps executed by the controller 10 according to the second exemplary embodiment. Here, a description is given under the assumption that the underwater drone 1 navigates in the observation mode at first.

In the observation mode, the underwater drone 1 navigates while capturing an image of the farmed fish which is present in a fish farming area (step 201). Next, the farmed fish identifier 111 identifies the farmed fish to be nurtured based on the camera information from the imaging camera 18 (step 202). Next, the movement controller 117 controls the steerer 20 and the propeller 21 to follow and approach the identified farmed fish (target fish) to be nurtured (step 203).

Next, the fishing light controller 112 controls the fishing light 24 to emit light to the target fish (step 204). In step 204, the fishing light controller 112 determines whether or not the distance d between the underwater drone 1 and the target fish is a predetermined distance d3 or less, for instance. When the distance d is the predetermined distance d3 or less, the fishing light controller 112 controls the fishing light 24 to emit light to the target fish. On the other hand, when the distance d is greater than the predetermined distance d3, the fishing light controller 112 does not control the fishing light 24 to emit light.

Next, the feed spread controller 113 controls the feed spreader 25 to spread feed over the target fish (step 205). In step 205, the feed spread controller 113 determines whether or not the distance d between the underwater drone 1 and the target fish is a predetermined distance d4 or less, for instance. When the distance d is the predetermined distance d4 or less, the feed spread controller 113 controls the feed spreader 25 to spread feed over the target fish. On the other hand, when the distance d is greater than the predetermined distance d4, the feed spread controller 113 does not control the feed spreader 25 to spread feed.

After the spreading of feed over the farmed fish 4 is completed, the movement controller 117 controls the steerer 20 and the propeller 21 to move the underwater drone 1 to the charge station (step 206). When the underwater drone 1 arrives at the charge station, transition is made from the support mode to the charge mode, and the charge controller 114 performs control to charge the battery 23 (step 207). Subsequently, the notifier 115 transmits the camera information and information indicating that feed has been spread over the farmed fish 4 to the central administration server (step 208). Then, the processing flow is completed. After charging is finished, the processing of step 201 is started again, thereby making transition from the charge mode to the observation mode.

It is to be noted that step 204 and step 205 in the above-described operation may be executed in any order. Also, any magnitude relationship between the distance d3 of step 204 and the distance d4 of step 205 is allowed, and when d3 and d4 are different, any one of d3 and d4 may be larger.

As described above, the underwater drone 1 according to this exemplary embodiment identifies poorly farmed fish or unhealthy farmed fish as the farmed fish to be nurtured from the farmed fish in a fish farming area. The underwater drone 1 approaches the identified farmed fish to be nurtured, and guides the farmed fish in a direction of the underwater drone 1 by emitting light and spreads feed.

For instance, when feed is spread without identifying the target farmed fish for which feed is spread, only well farmed fish or healthy farmed fish eats feed, and poorly farmed fish or unhealthy farmed fish may eat only a small amount of feed. Consequently, in the farmed fish, some farmed fish may grow up and are large, whereas some farmed fish may not grow up and remain small. Thus, by using the underwater drone 1 according to this exemplary embodiment, feed is intensively spread over the farmed fish to be nurtured, such as poorly farmed fish or unhealthy farmed fish.

Also, in this exemplary embodiment, the underwater drone 1 emits light such as ultraviolet wavelength light to guide the farmed fish to the underwater drone 1. However, the underwater drone 1 is not necessarily configured to transmit light. For instance, the underwater drone 1 may transmit guidance transmission waves such as sound waves which attract fish and favored by fish to guide the farmed fish in a direction of the underwater drone 1.

Furthermore, in this exemplary embodiment, the battery 23 has been described as a battery for charging (a secondary battery, a fuel cell). However, for instance, an internal combustion engine may be used as the primary battery or the power source. In addition, power may be supplied, for instance, from the outside such as the mother ship 2 to the underwater drone 1 via a power cable. When the battery 23 is not a battery for charging, the underwater drone 1 operates in the observation mode or the support mode without making transition to the charge mode.

Alternatively, in this exemplary embodiment, similarly to the first exemplary embodiment, the underwater drone 1 may catch the farmed fish by the catcher 22. In this case, the underwater drone 1 captures an image of the farmed fish, for instance, by the imaging camera 18, and identifies grown farmed fish, in other words, farmed fish with a predetermined size or greater. For instance, when the identified farmed fish approaches and enters a predetermined range around the underwater drone 1, the underwater drone 1 throws an arm, a harpoon, or a fishing net to the farmed fish to catch the fish.

Alternatively, in this exemplary embodiment, the underwater drone 1 may guide the farmed fish to be nurtured, such as poorly farmed fish or unhealthy farmed fish to a water area with lots of feed rather than provides feed to such farmed fish from the feed spreader 25. For instance, the underwater drone 1 identifies the farmed fish to be nurtured from the farmed fish in a fish farming area. The underwater drone 1 then approaches the identified farmed fish to be nurtured, and guides the farmed fish in a direction of the underwater drone 1. Subsequently, the underwater drone 1 moves to a water area with lots of feed while guiding the farmed fish to the underwater drone 1. In this manner, the farmed fish may be nurtured by guiding the farmed fish to a water area with lots of feed.

It is to be noted that although various embodiments and modifications have been described above, these embodiments and modifications may be naturally combined. The present disclosure is not limited to the exemplary embodiments described above, and may be carried out in various embodiments in a range without departing from the spirit of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An underwater mobile body comprising:
   a controller configured to control a movement of the underwater mobile body that is fully submerged underwater;
   a first detector configured to detect a position of a fish in water; and
   a guidance generator configured to guide the fish based on the position of the fish detected by the first detector,
   wherein the guidance generator guides the fish in a direction of a fishing net that is physically separated from the underwater mobile body, the fishing net being set in advance in a direction of a virtual line connecting the underwater mobile body and the fish, and
   wherein the underwater mobile body further comprises:
   a processor configured to:
   determine whether a distance between the underwater mobile body and the fish is less than or equal to a first threshold value;
   calculate at least one of a movement direction or a movement speed to move the underwater mobile body closer to the fish based on the distance between the underwater mobile body and the fish being less than or equal to the first threshold value;
   determine whether the distance between the underwater mobile body and the fish is less than or equal to a second threshold value; and
   output information to control the guidance generator to output a signal to guide the fish to a target location based on the distance between the underwater mobile body and the fish is less than or equal to the second threshold value.

2. The underwater mobile body according to claim 1, wherein the guidance generator guides the fish in a direction in which the fish moves away from the underwater mobile body.

3. The underwater mobile body according to claim 2, wherein the guidance generator generates waves which move toward the fish to stimulate the fish, and guides the fish in the direction in which the fish moves away from the underwater mobile body.

4. The underwater mobile body according to claim 3, wherein the guidance generator generates the waves which move toward the fish, and guides the fish based on the waves in the direction of the fishing net.

5. The underwater mobile body according to claim 1, wherein the controller controls the movement of the underwater mobile body to move in a predetermined formation with other underwater mobile bodies present in surroundings of the underwater mobile body.

6. The underwater mobile body according to claim 1, wherein based on information obtained from at least one of an imaging camera that captures an image of surroundings of the underwater mobile body and a second detector that detects a fish school in the surroundings of the underwater mobile body, the first detector detects a type of the fish or a size of the fish school including the fish.

7. The underwater mobile body according to claim 1, wherein the guidance generator guides the fish in a direction in which the fish moves closer to the underwater mobile body.

8. The underwater mobile body according to claim 7, further comprising
   a feed spreader that spreads feed over the fish guided in the direction in which the fish moves closer to the underwater mobile body.

9. The underwater mobile body according to claim 7, wherein the guidance generator emits light towards the fish, and guides the fish in the direction in which the fish moves closer to the underwater mobile body.

10. The underwater mobile body according to claim 9, wherein the guidance generator changes an intensity of the light emitted towards the fish according to a distance between the underwater mobile body and the fish.

11. The underwater mobile body according to claim 7, wherein the first detector captures an image of fish present in surroundings of the underwater mobile body, and when the fish whose image has been captured by the first detector satisfies a predetermined condition, the guidance generator guides the fish in the direction in which the fish moves closer to the underwater mobile body.

12. The underwater mobile body according to claim 11, wherein when the image captured by the first detector includes a plurality of fish, the guidance generator guides a fish which is out of the plurality of fish and which has a size or a movement speed satisfying a predetermined condition.

13. The underwater mobile body according to claim 1, wherein the underwater mobile body is configured to autonomously navigate fully underwater.

14. The underwater mobile body according to claim 13, wherein the underwater mobile body is configured to move in coordination with one or more other autonomous underwater bodies that are fully submerged in underwater.

15. The underwater mobile body according to claim 1, further comprising:
a camera configured to capture an image including a plurality of fish; and
a feed spreader that spreads feed,
wherein the controller is further configured to:
identify an individual target fish, among the plurality of fish in the captured image,
control the underwater mobile body to move closer to the identified target fish, and
control the feed spread over the target fish.

16. A non-transitory computer readable medium storing a program causing a computer to implement functions, the functions comprising:
controlling a movement of an underwater mobile body that is fully submerged underwater;
detecting a position of a fish in water; and
guiding the fish based on the detected position of the fish,
wherein the fish is guided in a direction of a fishing net that is physically separated from the underwater drone, the fishing net being set in advance in a direction of a virtual line connecting the underwater mobile drone and the fish, and
wherein the functions further comprises:
determining whether a distance between the underwater mobile body and the fish is less than or equal to a first threshold value;
calculating at least one of a movement direction or a movement speed to move the underwater mobile body closer to the fish based on the distance between the underwater mobile body and the fish being less than or equal to the first threshold value;
determining whether the distance between the underwater mobile body and the fish is less than or equal to a second threshold value; and
outputting information to control a guidance generator output a signal to guide the fish to a target location the distance between the underwater mobile body and the fish is less than or equal to the second threshold value.

17. An underwater drone comprising:
a memory configured to store one or more instructions; and
a processor configured to:
control a movement of the underwater drone that is fully submerged underwater;
detect a position of a fish in water; and
guide the fish based on the detected position of the fish,
wherein the processor is further configured to guide the fish in a direction of a fishing net that is physically separated from the underwater drone, the fishing net being set in advance in a direction of a virtual line connecting the underwater mobile drone and the fish, and
wherein the processor is further configured to:
determine whether a distance between the underwater mobile body and the fish is less than or equal to a first threshold value;
calculate at least one of a movement direction or a movement speed to move the underwater mobile body closer to the fish based on the distance between the underwater mobile body and the fish being less than or equal to the first threshold value;
determine whether the distance between the underwater mobile body and the fish is less than or equal to a second threshold value; and
output information to control the guidance generator to output a signal to guide the fish to a target location based on the distance between the underwater mobile body and the fish is less than or equal to the second threshold value.

18. The underwater drone according to claim 17, wherein the underwater drone is configured to autonomously navigate fully underwater.

19. The underwater drone according to claim 17, wherein the processor is further configured to:
determine whether a distance between the underwater mobile drone and the fish is less than or equal to a first threshold value;
calculate at least one of a movement direction or a movement speed to move the underwater mobile drone closer to the fish based on the distance between the underwater mobile body and the fish being less than or equal to the first threshold value;
determine whether the distance between the underwater mobile drone and the fish is less than or equal to a second threshold value; and
output information to control a guidance generator output a signal to guide the fish to a target location based the distance between the underwater mobile body and the fish is less than or equal to the second threshold value.

* * * * *